C. C. CLARK.
ROLLING STOCK.
APPLICATION FILED OCT. 27, 1916.
1,240,673.
Patented Sept. 18, 1917.
2 SHEETS—SHEET 1.
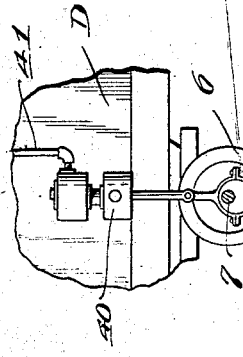
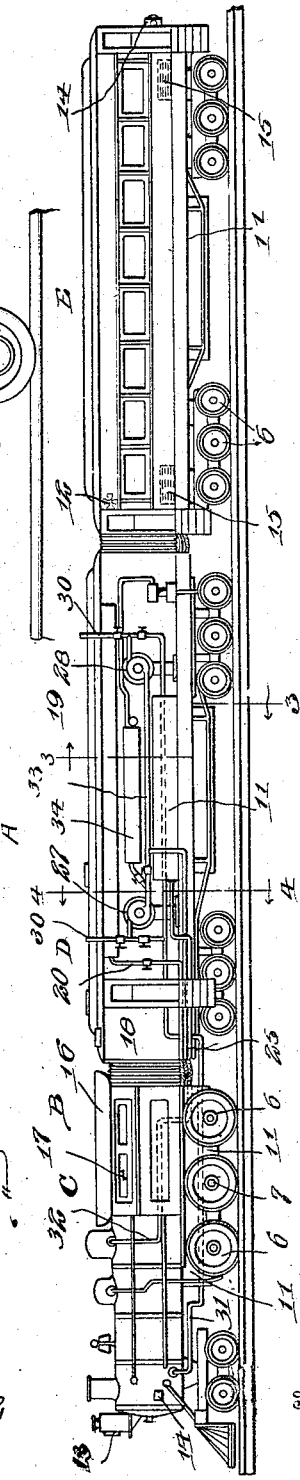
Witness
Frederick L. Fry
Frank Hough
Inventor
C. C. Clark
By Victor J. Evans
Attorney

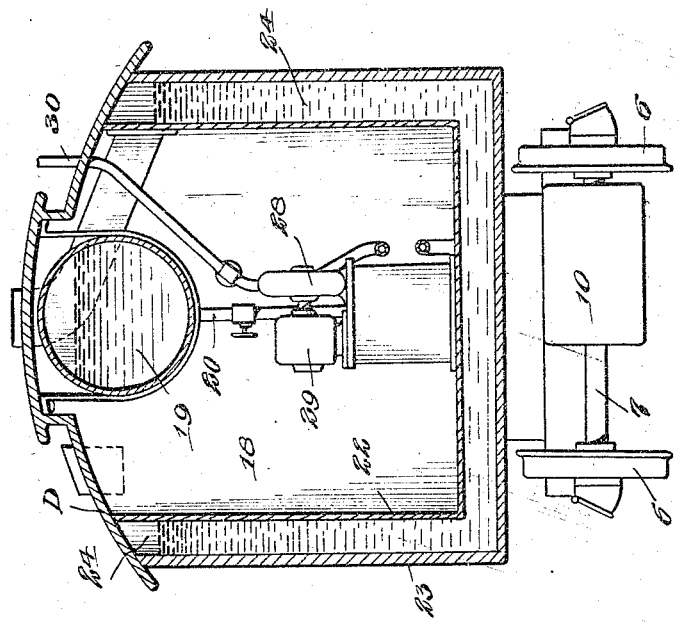

UNITED STATES PATENT OFFICE.

CHARLES C. CLARK, OF BUFFALO, NEW YORK.

ROLLING-STOCK.

1,240,673.  Specification of Letters Patent. Patented Sept. 18, 1917.

Application filed October 27, 1916. Serial No. 128,089.

*To all whom it may concern:*

Be it known that I, CHARLES C. CLARK, a citizen of the United States, residing at Buffalo, in the county of Erie and State of New York, have invented new and useful Improvements in Rolling-Stock, of which the following is a specification.

This invention relates to railroad rolling stock and more particularly to rolling stock which is of the electrically propelled type and which may be used advantageously either for freight or passenger service.

The primary object of the invention is to provide rolling stock of this character which is in the form of a tractor, the propelling mechanism of which may be operated under the influence of electricity conveyed thereto from storage batteries carried by the tractor and which are constantly kept charged with electricity by dynamos operable under the influence of turbines propelled by steam generated within a boiler upon the tractor or by air compressed within storage tanks by suitable mechanism having connection with the traction wheels of the tractor and operated thereby when the tractor is in motion.

Another object of the invention is to provide a tractor of this character which is so constructed that a supply of coal and oil may be carried thereby and independently or simultaneously fed to a fire box beneath the boiler for generating steam which operates the turbines having connection with the dynamos which supply the storage batteries with electricity by means of which the tractor is propelled thus enabling the tractor to be used for longer hauls than is possible with tractors now in use and through places in which the procuring of fuel is difficult.

Another object of the invention is to provide a tractor of this character having an auxiliary coach which is so constructed as to permit a portion of the coach to serve as a reservoir in which may be stored water to be fed to the boiler for generating steam for operating the dynamo operating turbines with the reservoir having arranged therein a heating coil having connection with a storage battery therein supplied with electricity from said dynamos so that the water may be fed to the boiler in a heated condition.

With these and other objects in view, the invention resides in the novel combination and arrangement of parts, which will be hereinafter described and particularly pointed out in the claims.

The preferred embodiment of the invention has been illustrated in the accompanying drawings, although no restriction is necessarily made to the precise details of construction therein shown, as changes, alterations, and modifications within the scope of the claims may be resorted to when desired.

In the drawings:

Figure 1 is a diagrammatic view of rolling stock constructed in accordance with the invention.

Fig. 2 is a view in elevation partly in section of a tractor constructed in accordance with the invention.

Fig. 3 is a vertical transverse section on the line 3—3 of Fig. 1.

Fig. 4 is a view similar to Fig. 3 taken on the line 4—4 of Fig. 1.

Fig. 5 is a detail view of the air compressing mechanism.

Like characters of reference denote corresponding parts throughout the several views in the drawings.

Referring now to the drawings in detail, the letter A designates railroad rolling stock constructed in accordance with the invention and which comprises a tractor B having a main section C detachably connected with an auxiliary section D with which is connected in the usual manner a coach E, said tractor and coach being supported upon a track in the usual manner by traction wheels 6, the axles 7 of which have connected therewith gear wheels 8 meshing with similar wheels 9 on the shafts of electrically driven motors arranged in casings 10 supported by the axles 7 with the coach E and sections C and D of the tractor B each supplied with a pair of storage batteries 11 and having suitable electrical connection with the motors arranged in the casings 10 so that the motors may be operated thereby to revolve the traction wheels 6 and cause the rolling stock to be propelled over the track.

The tractor B and coach E may be supplied with electric fans 12 and the usual head and signal lights 13 and 14 which may be energized by the electricity stored in the batteries 11, the coach E being supplied with electrical heaters 15 having connection with said batteries.

The section C of the tractor B is in the form of the usual steam locomotive and has arranged in the cab 16 thereof, a controller 17 for controlling the operation of the motors connected with the axles of the traction wheels on the sections C and D of the tractor and the coach E, it will be understood, of course, that if found desirable the section D and coach E may be supplied with controllers similar to the controller 17 for controlling the motors connected with the axles of the wheels thereon.

The section D of the tractor which is in the form of an ordinary railroad coach is provided at its forward end with a coal compartment 18 and has secured to the roof of the coach in the rear of said compartment an oil tank 19 in which fuel oil may be stored, said tank being provided with a supply pipe 20 extending within the section C and provided with oil burners 21 arranged beneath the boiler in the section C, so that the oil in the tank 19 or the coal in the compartment 18 may be used to generate steam in the boiler on the section C as found desirable.

The section D of the tractor is provided for a portion of its length with inner and outer walls 22 and 23 which are spaced apart to provide a water reservoir 24 in which may be stored water to be supplied to the boiler in the section C by means of a supply pipe 25, said reservoir having arranged therein a heating coil 26 having connection with the storage batteries 11 in the section D so that the water may be supplied to the boiler in the section C in a heated condition.

Arranged within the section D of the tractor are a pair of engines 27 and 28 of the rotary type with each engine operatively connected with a dynamo 29 for supplying electricity to the storage batteries 11 connected with the tractor and coach E with each engine having connected therewith a valve exhaust pipe 30 having connection with a main exhaust pipe 31 communicating with the interior of the section C below the smoke stack thereon to permit the escape of steam from the engines conveyed thereto from the boiler in the section C by a main steam supply pipe 32 having connection with the engines 27 through the medium of a valve branch pipe 33.

Through the above described manner of connecting the engines 27 and 28 with the steam supply and exhaust pipe, it will be seen that the engines may be operated independently or simultaneously to insure the charging of the storage batteries 11 by the dynamos 29.

A pair of tanks 34 for the reception of compressed air are independently connected with the engines 27 and 28 by means of valve discharge pipes 39, so that when the valves in the branch pipe 33 are closed, the engines may be run by compressed air which may be either discharged therefrom through the exhaust pipes 30 or through the main exhaust pipe 31 as found desirable, said tanks being filled with air under compression by means of an air compressing engine 40 arranged within the section D and operatively connected by means of an eccentric with the axle of one set of the traction wheels 7 so that when the tractor is in motion, the compressing engine will be operated to force compressed air into the tanks 34 through a valve pipe 41 having connection with said tanks and the engine.

With rolling stock constructed as above described, it will be seen that the storage batteries 11 will at all times be charged to their maximum capacity with electricity by the engines 27 and 28 operable under the influence of the fluid conveyed thereto from the boiler in the section C or the tanks 34 in the section D and that by the operation of the controller 17, the current from said storage batteries may be conveyed to the motors in the casings 10 to operate the same and cause the traction wheels of the rolling stock to be revolved.

From the foregoing description, taken in connection with the accompanying drawings, it is at once apparent that rolling stock for railroads has been provided which is so constructed as to render the same highly efficient in use.

Having thus described the invention, what is claimed as new, is:

1. A tractor comprising a main section, an auxiliary section detachably connected with the main section, electrically driven motors operatively connected with the drive wheels on said main and auxiliary sections, means for supplying electrical energy to said motors including fluid propelled engines, independent fluid power generating mechanisms carried by each of said sections, and means for conveying fluid power from said mechanisms to said engines either independently or simultaneously.

2. A tractor comprising a main section having steam generating mechanism including a boiler, an auxiliary section connected with said main section to serve as a water reservoir, electrically operated motors operatively connected with the drive wheels of said sections, means for supplying electrical energy to said motors including said steam operated engines carried by said auxiliary section and having connection with the section and having connection with the steam dome on said boiler and means for heating and transferring water from said auxiliary section to said boiler.

3. A tractor comprising a main section having steam generating mechanism including a boiler, an auxiliary section connected with said main section, electrically operated motors operatively connected with the drive wheels of said sections, means for supplying electrical energy to said motors including fluid operated engines having connection with the steam dome on said boiler, and fuel storage tanks in said auxiliary section having discharge pipes extending beneath said boiler.

In testimony whereof I affix my signature.

CHARLES C. CLARK.